US008521887B2

(12) United States Patent
Tran et al.

(10) Patent No.: US 8,521,887 B2
(45) Date of Patent: *Aug. 27, 2013

(54) AGGREGATING CONNECTION MAINTENANCE TO OPTIMIZE RESOURCE CONSUMPTION

(75) Inventors: Anh P. Tran, Seattle, WA (US); Lloyd Alfred Moore, Seattle, WA (US); M. Omar Maabreh, Bellevue, WA (US); Adam Sapek, Redmond, WA (US); Gary Jason Waliczek, Seattle, WA (US); Upender R. Sandadi, Issaquah, WA (US); Albert Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/329,364

(22) Filed: Dec. 19, 2011

(65) Prior Publication Data

US 2012/0089720 A1 Apr. 12, 2012

Related U.S. Application Data

(63) Continuation of application No. 12/055,313, filed on Mar. 26, 2008, now Pat. No. 8,099,505.

(51) Int. Cl.
*G06F 15/16* (2006.01)
(52) U.S. Cl.
USPC ........................................ 709/227; 709/230
(58) Field of Classification Search
None
See application file for complete search history.

(56) References Cited

U.S. PATENT DOCUMENTS

| | | | | |
|---|---|---|---|---|
| 5,153,909 A | * | 10/1992 | Beckle et al. | 379/265.03 |
| 6,981,048 B1 | * | 12/2005 | Abdolbaghian et al. | 709/228 |
| 7,035,214 B1 | * | 4/2006 | Seddigh et al. | 370/231 |
| 7,088,698 B1 | * | 8/2006 | Harsch | 370/338 |
| 7,269,148 B2 | * | 9/2007 | Takagi et al. | 370/328 |
| 7,406,087 B1 | * | 7/2008 | Quach et al. | 370/401 |
| 7,523,139 B1 | * | 4/2009 | Kemkar et al. | 1/1 |
| 7,532,577 B2 | * | 5/2009 | Park et al. | 370/241 |
| 2003/0084161 A1 | * | 5/2003 | Watson et al. | 709/227 |
| 2004/0250059 A1 | * | 12/2004 | Ramelson et al. | 713/150 |
| 2004/0264381 A1 | * | 12/2004 | Banerjee et al. | 370/252 |
| 2006/0020707 A1 | | 1/2006 | Undery et al. | |
| 2006/0123119 A1 | * | 6/2006 | Hill et al. | 709/227 |

(Continued)

FOREIGN PATENT DOCUMENTS

EP 1860832 A1 11/2007
WO 2007083000 A1 7/2007

OTHER PUBLICATIONS

Lin, et al., "An Embedded Web Server for Equipments", ispan, 2004 International Symposium on Parallel Architectures, Algorithms and Networks (ISPAN'04), 2004, pp. 345-350.

(Continued)

*Primary Examiner* — Bunjob Jaroenchonwanit

(57) ABSTRACT

Combining network connection maintenance operations that use a resource to extend battery life. Each of the network connections has a timer and a defined tolerance for early connection maintenance. After receiving notification of an event, the network connections are accessed to identify the connections for which a maintenance operation may be performed early based on the timer and the tolerance. In an embodiment, the maintenance operation includes sending a transmission control protocol (TCP) keep-alive packet on the connection.

20 Claims, 3 Drawing Sheets

(56) References Cited

U.S. PATENT DOCUMENTS

| | | | |
|---|---|---|---|
| 2007/0019610 A1* | 1/2007 | Backholm et al. | 370/349 |
| 2007/0140159 A1* | 6/2007 | Eronen et al. | 370/328 |
| 2007/0240209 A1 | 10/2007 | Lewis et al. | |
| 2008/0244148 A1* | 10/2008 | Nix et al. | 710/313 |
| 2009/0175282 A1* | 7/2009 | Babin et al. | 370/401 |
| 2009/0182608 A1* | 7/2009 | Tran et al. | 705/9 |
| 2009/0182802 A1* | 7/2009 | Tran et al. | 709/203 |
| 2009/0183157 A1* | 7/2009 | Tran et al. | 718/100 |

OTHER PUBLICATIONS

Tuduce, et al., "Organizing a Distributed Application in a Mobile Ad Hoc Network", Proceedings of the Second IEEE International Symposium on Network Computing and Applications, Year of Publication: 2003, pp. 231-238.

Haverinen, et al., "Energy Consumption of Always-On Applications in WCDMA Networks", Vehicular Technology Conference, 2007. VTC2007-Spring. IEEE 65th, Publication Date: Apr. 22-25, 2007, pp. 964-968.

* cited by examiner

AGGREGATING CONNECTION MAINTENANCE TO OPTIMIZE RESOURCE CONSUMPTION

CROSS-REFERENCE TO RELATED APPLICATION

This application is a continuation of commonly-owned, co-pending U.S. patent application Ser. No. 12/055,313, filed Mar. 26, 2008, the entire disclosure of which is hereby incorporated by reference herein for all purposes.

BACKGROUND

Mobile computing devices, such as mobile phones and personal digital assistants (PDA), have become increasingly popular in recent years. As the devices continue to get smaller, there are increasing limitations in resources such as memory, storage, bandwidth, and battery. Additionally, more applications now require increasing levels of such resources. For example, many applications providing real-time updates (e.g., calendars, electronic mail, instant messaging) require frequent radio usage to persist connections. After the radio powers on to send data, the radio can take several seconds to power off (e.g., about 3 seconds on 2.5G networks and about 20 seconds on 3G networks). This radio "tail" absorbs power and diminishes device battery life.

SUMMARY

Embodiments of the invention manage network connection maintenance to take opportunistic advantage of available resources. Each network connection has a timer value and a tolerance factor. After a notification of an event such as resource availability is received, network connections are identified based on the received notification, the timer value, and the tolerance factor. For example, some network connections will be identified for early maintenance based on the tolerance factor to make use of the available resource while the resource is already powered up for another task.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the invention provide a communication protocol stack 202 executing on a computing device 204 that performs maintenance operations on one or more network connections. The communication protocol stack 202 performs the maintenance operations within time bounds for each connection, yet aggregates the operations to take advantage of available resources.

The network connections are associated with one or more application programs 207. Each of the applications has at least one communication socket open in the communication protocol stack 202 (e.g., the connection), while all sockets utilize a common network resource (e.g., a radio). The communication protocol stack 202 maintains a timer for each of the network connections. The timer measures, for example, periods of inactivity on the connections. Each of the network connections also has a tolerance factor 306 indicating availability of the connection for early performance of the maintenance. The network connections are associated with the application programs 207 such as application program #1 through application program #M. Maintenance of the connections includes performing or executing one or more maintenance operations on the connections based on the timer within the predefined tolerance. The maintenance operations includes, for example, keeping each of the connections open by sending a keep-alive packet on the connections.

Figure 1:
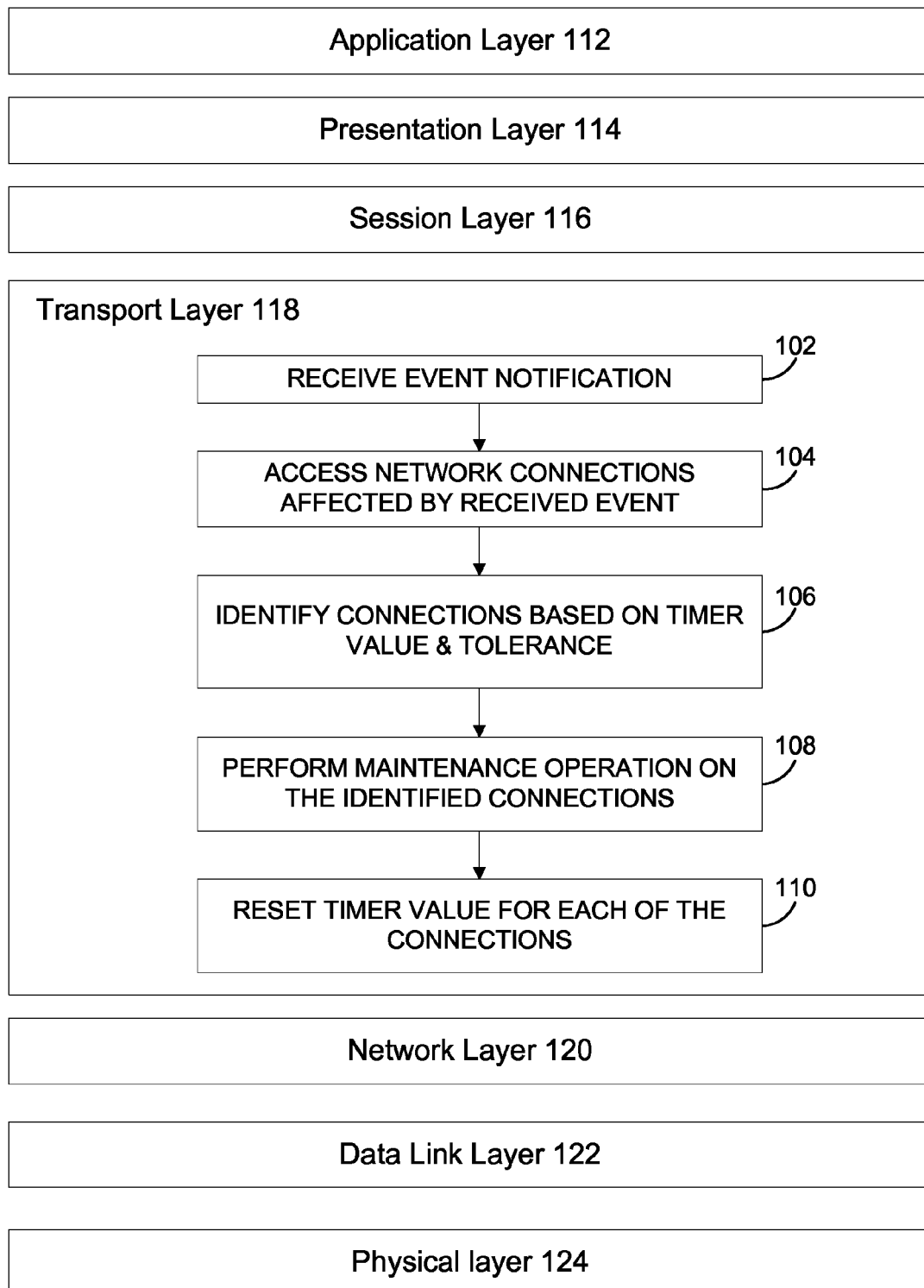
FIG. 1 is an exemplary flow chart illustrating a notification operation in a communication protocol stack.

Exemplary operation of the communication protocol stack 202 is shown in FIG. 1. While aspects of the invention are described and illustrated with reference to the transmission control protocol (TCP) as the communication protocol, it will be appreciated that embodiments of the invention are applicable to any communication protocol on a network that provides support for keep-alive packets. For example, another protocol within the scope of embodiments of the invention includes the hypertext transfer protocol (HTTP). At 102, an event notification is received. The network connections affected by the received event are accessed at 104. Connection data 209 associated with the network connections includes a timer value 304 and the tolerance factor 306 among other properties. The tolerance factor 306 includes any means for indicating or communicating the early availability of the connection for maintenance operations. For example, the tolerance factor 306 includes, but is not limited to, a constant value (e.g., in minutes or seconds) and a percentage (e.g., a percentage of a maximum interval duration 302 such as 10%). For the latter, the percentage is applied to the maximum interval duration 302 to create a time value for comparison with the timer value 304. For example, the maximum interval duration 302 corresponds to a maximum amount of time permissible between keep-alive packets sent the by application program 207. In an embodiment, the maximum interval duration 302 is set by the application program 207. In another embodiment, the tolerance factor 306 is an argument in an input/output control interface (IOCTL).

At 106, one or more of the connections are identified as a function of the event notification, the timer value 304, and the tolerance factor 306 of each of the connections. For example, the communication protocol stack 202 identifies the connections affected by the event, or otherwise identifies the connections to which the event applies. The communication protocol stack 202 further selects, from the identified connections, those connections that are available for maintenance early based on the tolerance factor 306 for each of the connections. For example, the communication protocol stack 202 compares the timer value 304 for each of the connections to the maximum interval duration 302. For all comparisons that are within tolerance, the corresponding connections are selected for operations. The maintenance operations are performed on the identified connections at 108. The maintenance operations include, for example, sending a keep-alive packet on each of the identified connections.

By adjusting the timing of the maintenance operations, the communication protocol stack 202 reduces use of resources and minimizes use of bandwidth.

The timer includes any means for measuring elapsed time since activity on the connections. For example, the timer includes a countdown timer that is initially set to count down from a value corresponding to the maximum interval duration 302. Alternatively or in addition, the timer provides stopwatch functionality that is initially set to zero. The communication protocol stack 202 maintains such a timer by performing the maintenance operation just prior to the maximum interval duration 302 being reached.

In an embodiment in which the communication protocol stack 202 executes on or otherwise controls a mobile computing device (e.g., in kernel mode), operation of the communication protocol stack 202 extends battery life by aggregating maintenance operations for the connections to optimize use of available resources. The connections are selected based on the event. The event includes any condition such as a particular time, device condition, and/or a user mode event. For example, if the event indicates that a resource is available (e.g., a network or network type), identifying the connections includes identifying the connections that use the resource.

By aggregating the maintenance operations, the communication protocol stack 202 operates to extend battery life of the mobile computing device by taking advantage of resources while the resources are available and minimization of overhead. For example, when there is an asynchronous cellular, wireless-fidelity (Wi-Fi), or other radio transceiver event (e.g., a server sends the device data or the user initiates a web browsing session), the communication protocol stack 202 scans a database 210 and finds connections that can piggyback or leverage the radio usage. Aggregating maintenance operations in this manner minimizes radio spin ups. In other embodiments, the communication protocol stack 202 operates to minimize the frequency of bringing the computing device 204 out of an idle state. Other resources are within the scope of embodiments of the invention such as infrared communication devices and fiber optic communication devices.

Alternatively or in addition, if the communication protocol stack 202 determines that a resource will not be placed into a high consumption state during unadjusted performance the maintenance operations, the communication protocol stack 202 will not aggregate the maintenance operations.

Referring again to FIG. 1, operations 102, 104, 106, 108, and 110 are shown superimposed upon the seven layer Open Systems Interconnection (OSI) protocol model. The seven layers include an application layer 112, a presentation layer 114, a session layer 116, a transport layer 118, a network layer 120, a data link layer 122, and a physical layer 124. The placement of the operations 102, 104, 106, 108, and 110 within the OSI model indicates that the operations are performed at the transport layer 118, in exemplary embodiments.

While described in some embodiments with reference to the mobile computing device, aspects of the invention are applicable other devices. Further, while described in some embodiments with reference to the communication protocol stack 202, aspects of the invention are applicable to any component performing the functionality illustrated and described herein. For example, the functionality is implemented in any kernel level application for any communication protocol.

In an example in which Applications A, B, and C all require a network connection, maintenance operations for Applications B & C can be batched or aggregated with those of Application A based on the tolerance factor 306. If the maintenance operations for Application A spins up a radio event, that event will be published and then maintenance operations for Applications B & C are executed to take advantage of the radio event. If it turns out that the maintenance operations for Application A never needed a network, then the maintenance operations for Applications B and C will execute as originally scheduled (e.g., just prior to expiration of the maximum interval duration 302).

After execution of the maintenance operations or any network activity on the connections, the communication protocol stack 202 resets the timer or timer value 304 for each of the connections at 110. For example, the communication protocol stack 202 resets the timer after the transmission or receipt of data on each of the connections. Each of the connections has the maximum interval duration 302 corresponding to a maximum permissible amount of time of inactivity on the connection. The maximum interval duration 302 is set by the application program 207 or user when establishing the connection. As such, the actual time periods of inactivity for each connection may be shorter than the maximum interval duration 302 but will never be longer than the maximum interval duration 302. A timeout of the connection is thus avoided.

Figure 2:
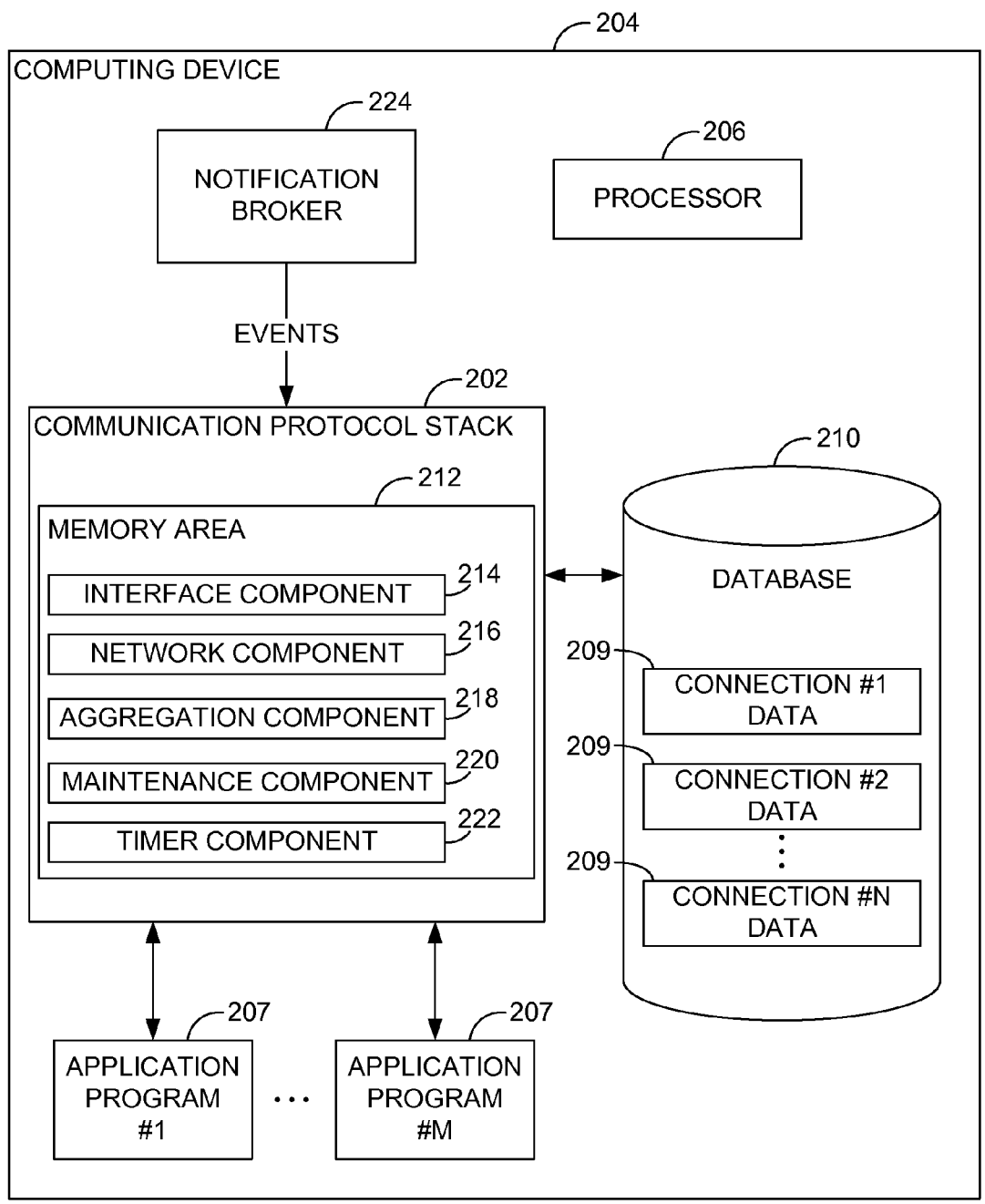
FIG. 2 is an exemplary block diagram illustrating a communication protocol stack executing on a computing device.

Referring to FIG. 2, an exemplary block diagram illustrates the communication protocol stack 202 executing on the computing device 204. The computing device 204 includes, for example, a mobile device such as a personal digital assistant (PDA) or a mobile telephone. A processor 206 is configured to execute computer-executable instructions for receiving the maximum interval duration 302 and the tolerance factor 306 for each of the TCP connections and storing the received data in the database 210 or other memory area. The received data is stored as the connection data 209 such as connection data #1 through connection data #N for each of the N example connections in FIG. 1. The processor 206 is configured to maintain the timer value 304 for each of the connections by adjusting the timer value 304 as a function of an elapsed time since the last activity on the connection.

The processor 206 is further configured to execute computer-executable instructions embodied in one or more components. One or more computer-readable media store the computer-executable components for implementing embodiments of the communication protocol stack 202. For example, the components are stored on a memory area 212 and include an interface component 214, a network component 216, an aggregation component 218, a maintenance component 220, and a timer component 222. The interface component 214 receives notification of an event (e.g., notice of availability of a power-consuming resource or network resource on the computing device 204). For example, the event may be a state event, such as boot up, detecting a predetermined connection type such as a Wi-Fi connection or a cellular connection, and/or reestablishing network connection after initially losing network connectivity, or other state of the computing device 204. Further, the event notifications are received from a notification broker 224 or any other eventing, notification, or state system. While the notification broker 224 in FIG. 2 is shown as executing on the computing device 204, the notification broker 224 alternatively or in addition executes on another computing device (e.g., communicating with the computing device 204 via a network).

Based on the event information received by the interface component 214, the network component 216 identifies a plurality of open connections that use the resource. In an example in which the received event indicates availability of a particular network resource, the network component 216 identifies the connections that use the particular network resource. The aggregation component 218 selects one or more of the connections identified by the network component 216 for which time remaining on the timer is within the tolerance factor 306.

For example, the aggregation component 218 selects those connections for which an analysis of the timer value 304 indicates that expiration of the timer will fall within a time frame corresponding to the tolerance. The timer component 222 maintains the timer for each of the connections (e.g., adjust the timer as time progresses). While the communication protocol stack 202 may process data with a granularity on the order of milliseconds, embodiment of the timer component 222 maintain values with a granularity on the order of seconds.

The maintenance component 220 performs the maintenance operations on the connections selected by the aggregation component 218. For example, the maintenance component 220 sends, via the network resource, a keep-alive packet on the connections selected by the aggregation component 218 to persist the selected connections or otherwise prevent the connections from closing (e.g., a timeout).

Figure 3:
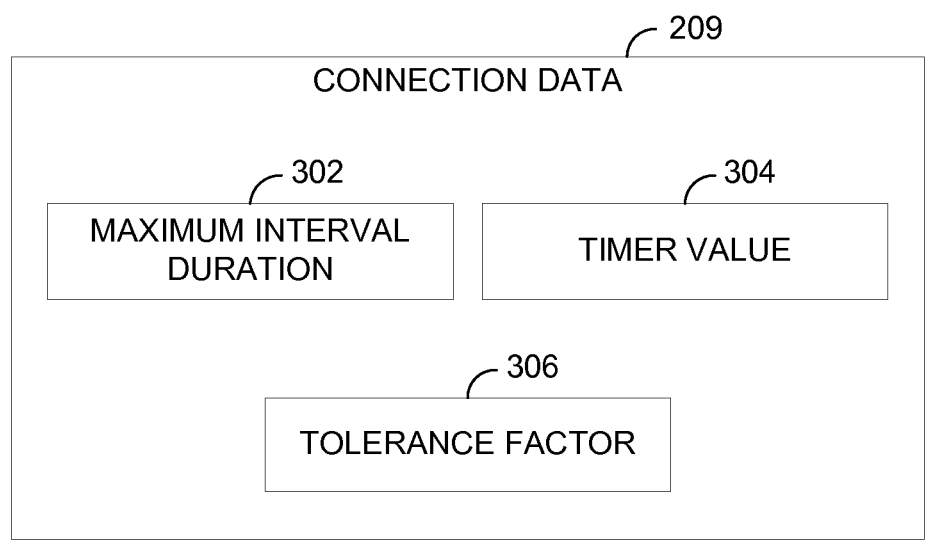
FIG. 3 is an exemplary block diagram illustrating a data structure representing connection data.

Referring to FIG. 3, an exemplary block diagram illustrates a data structure representing the connection data 209. The connection data 209 includes the maximum interval duration 302, the timer value 304, and the tolerance factor 306.

Exemplary Operating Environment

A computing device or computer such as described herein has one or more processors or processing units and a system memory. The computer typically has at least some form of computer readable media comprising computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations.

Embodiments of the invention may be described in the general context of computer-executable instructions, such as program modules, executed by one or more computers or other devices. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for identifying one or more of the connections as a function of the received event notification, the timer value 304, and the tolerance factor 306 of each of the connections, and exemplary means for altering the timer value 304 in the communication protocol stack 202 for each of the connections to coordinate sending keep-alive packets to minimize use of network resources.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
   a memory area for storing a timer value, a maximum interval duration, and a tolerance factor for each of a plurality of open transmission control protocol (TCP) connections, said tolerance factor indicating early availability of the associated TCP connection for maintenance operations; and
   a processor associated with a computing device, said processor configured to execute computer-executable instructions for:
      receiving the maximum interval duration and the tolerance factor for each of the TCP connections;
      storing the received maximum interval duration and the received tolerance factor in the memory area;
      adjusting the timer value for each of the TCP connections as a function of an elapsed time since activity on the TCP connection;
      receiving notification of an event at a notification time;
      identifying, in response to the received notification, one or more of the TCP connections to which the received notification applies and for which a difference between the timer value and the maximum interval duration is within the tolerance factor to aggregate the maintenance operations of the identified TCP connections; and
      sending a keep-alive packet over each of the identified TCP connections.

2. The system of claim 1, wherein the tolerance factor comprises an argument in an input/output control interface.

3. The system of claim 1, further comprising means for identifying the one or more of the TCP connections as a function of the received event notification, the timer value, and the tolerance factor of each of the TCP connections.

4. The system of claim 1, further comprising means for altering the timer value in a TCP stack for each of the TCP connections to coordinate sending TCP keep-alive packets to minimize use of network resources.

5. A method comprising:
   receiving, by a computing device, an event notification;
   accessing a plurality of open network connections on the computing device, each of said network connections having associated therewith a timer value and a tolerance factor, said tolerance factor indicating early availability of the associated network connection for maintenance operations;

identifying, by the computing device, one or more of the accessed network connections as a function of the received event notification, the timer value, and the tolerance factor of each of the accessed network connections to aggregate the maintenance operations for the identified network connections in response to the received event notification and availability of the maintenance operations to be performed earlier than scheduled based on the tolerance factor; and performing, by the computing device, one or more of the maintenance operations on the identified network connections.

6. The method of claim 5, wherein performing the maintenance operation on the identified network connections comprises sending, by a kernel level application executing on the computing device, a keep-alive packet on each of the identified network connections.

7. The method of claim 5, wherein each of the plurality of network connections has an interval duration defining a maximum permissible time of inactivity on the network connection, and further comprising resetting the timer value for each of the identified network connections based on the interval duration for the network connection.

8. The method of claim 7, wherein resetting the timer value comprises adding the interval duration for each of the network connections to a time of receipt of the notification.

9. The method of claim 7, wherein the tolerance factor comprises a percentage value, and wherein identifying the one or more of the accessed network connections comprises:
 applying the percentage value to the interval duration for each of the network connections to create a time value;
 comparing the timer value to the time value for each of the network connections; and
 identifying one or more of the network connections based on said comparing.

10. The method of claim 5, wherein the tolerance factor comprises a time value, and wherein identifying the one or more of the accessed network connections comprises:
 comparing the timer value to the time value for each of the network connections; and
 identifying one or more of the network connections based on said comparing.

11. The method of claim 5, wherein receiving the event notification comprises receiving notification that a network resource is available, and wherein identifying the one or more of the accessed network connections comprises identifying one or more of the network connections having maintenance operations associated therewith that use the available resource during performance.

12. The method of claim 5, further comprising:
 tracking activity on each of the network connections; and
 resetting the timer value for each of the network connections responsive to said tracking.

13. The method of claim 5, wherein receiving the event notification comprises receiving notification of a user mode event.

14. The method of claim 5, further comprising receiving the tolerance factor for one of the network connections from an application program associated with said one of the network connections.

15. The method of claim 5, wherein accessing the plurality of open network connections on the computing device comprises accessing a plurality of open hypertext transfer protocol (HTTP) connections on the computing device.

16. The method of claim 5, wherein performing the one or more of the maintenance operations on the identified network connections comprises performing one or more of the maintenance operations on the identified network connections at a transport layer in a multi-layer protocol model.

17. One or more computer-readable storage media having computer-executable components for aggregating network maintenance operations based on availability of a resource in a computing device and on availability of the network maintenance operations to be performed earlier than scheduled based on a tolerance factor, said components comprising:
 an interface component for receiving notification of availability of a network resource on the computing device;
 a network component for identifying a plurality of open transmission control protocol (TCP) connections that use the network resource, each of said TCP connections having associated therewith a timer and the tolerance factor, said tolerance factor indicating early availability of the associated TCP connection for one or more of the network maintenance operations;
 an aggregation component for selecting, in response to the notification of availability of the network resource received by the interface component, one or more of the identified plurality of TCP connections for which time remaining on the timer is within the tolerance factor; and
 a maintenance component for sending, via the network resource, a keep-alive packet on the TCP connections selected by the aggregation component to persist the selected TCP connections, said interface component, said network component, said aggregation component, and said maintenance component executing on the computing device.

18. The computer-readable storage media of claim 17, further comprising a timer component for maintaining the timer associated with each of the TCP connections.

19. The computer-readable storage media of claim 18, wherein the timer component maintains the timer with a granularity on the order of seconds.

20. The computer-readable storage media of claim 17, wherein the network resource comprises a transceiver associated with the computing device.

* * * * *